US011332677B2

(12) United States Patent
White et al.

(10) Patent No.: US 11,332,677 B2
(45) Date of Patent: May 17, 2022

(54) ENHANCED DEMULSIFIER PERFORMANCE RANKING PROCEDURE AND ALGORITHM BASED ON SEPARATION EFFICIENCY

(71) Applicant: Saudi Arabian Oil Company, Dhahran (SA)

(72) Inventors: Ramsey James White, Abqaiq (SA); Debora Salomon Marques, Dhahran (SA); Nasser Aiyd Alhajri, Abqaiq (SA); Sajjad Al-Khabaz, An Nasirah (SA)

(73) Assignee: Saudi Arabian Oil Company, Dhahran (SA)

( * ) Notice: Subject to any disclaimer, the term of this patent is extended or adjusted under 35 U.S.C. 154(b) by 72 days.

(21) Appl. No.: 16/869,410

(22) Filed: May 7, 2020

(65) Prior Publication Data

US 2021/0348069 A1 Nov. 11, 2021

(51) Int. Cl.
| | | |
|---|---|---|
| *C10G 33/08* | (2006.01) | |
| *C10G 33/04* | (2006.01) | |
| *G01F 1/86* | (2006.01) | |

(52) U.S. Cl.
CPC .............. *C10G 33/08* (2013.01); *C10G 33/04* (2013.01); *G01F 1/86* (2013.01)

(58) Field of Classification Search
CPC ................................ C10G 33/04; C10G 33/08
See application file for complete search history.

(56) References Cited

U.S. PATENT DOCUMENTS

| | | |
|---|---|---|
| 4,581,134 A | 4/1986 | Richter, Jr. et al. |
| 4,977,915 A | 12/1990 | Marrelli |
| 5,129,468 A | 7/1992 | Parmenter |
| 5,353,237 A | 10/1994 | Bass et al. |
| 6,535,795 B1 | 3/2003 | Schroeder et al. |
| 7,318,476 B2 | 1/2008 | Ayers |
| 7,373,276 B2 | 5/2008 | Bettge |
| 7,721,806 B2 | 5/2010 | Ayers |
| 9,120,983 B2 | 9/2015 | Wickes et al. |
| 9,157,035 B1 | 10/2015 | Ball, IV et al. |
| 2007/0299143 A1 | 12/2007 | Koczo et al. |
| 2010/0312401 A1 | 12/2010 | Gutierrez et al. |
| 2013/0024026 A1 | 1/2013 | Prasad |
| 2013/0026082 A1 | 1/2013 | Al-Shafei et al. |
| 2013/0104772 A1 | 5/2013 | Schabron et al. |
| 2013/0140216 A1 | 6/2013 | Wickes et al. |
| 2014/0026085 A1 | 1/2014 | Amminudin et al. |
| 2014/0066668 A1 | 3/2014 | Lorenz |
| 2014/0202929 A1 | 7/2014 | Mason et al. |
| 2015/0218461 A1 | 8/2015 | Schabron et al. |
| 2015/0322348 A1 | 11/2015 | Dasgupta |
| 2015/0361350 A1 | 12/2015 | Prasad |
| 2016/0052799 A1 | 2/2016 | Grave |
| 2017/0072376 A1 | 3/2017 | Schabron et al. |
| 2018/0195010 A1 | 7/2018 | Sain |
| 2018/0371876 A1 | 12/2018 | Lopez et al. |
| 2019/0010796 A1 | 1/2019 | De Freitas |
| 2019/0062645 A1 | 2/2019 | Al Seraihi |
| 2019/0202986 A1 | 7/2019 | Alegre |
| 2019/0205213 A1 | 7/2019 | Kershaw |
| 2019/0229960 A1 | 7/2019 | Lopez |
| 2019/0232959 A1 | 8/2019 | Kershaw |
| 2019/0240596 A1 | 8/2019 | Less |
| 2019/0299180 A9 | 10/2019 | Schabron et al. |

FOREIGN PATENT DOCUMENTS

| | | |
|---|---|---|
| WO | 2017023858 | 2/2017 |
| WO | 2018129228 | 7/2018 |

OTHER PUBLICATIONS

PCT International Search Report and Written Opinion in International Appln. PCT/US2021/030815, dated Aug. 3, 2021, 13 pages.
GCC Examination Report issued in GCC Application No. 2018-35516 dated Sep. 25, 2020, 3 pages.
EP Communication Pursuant to Article 94 (3) EPC issued in European Appln. No. 18746326.0, dated Feb. 23, 2021, 7 pages.
Alshehri, Ali Khairan; "Modeling and Optimization of Desalting Process in Oil Industry", Thesis presented to the University of Waterloo, ON Canada, 2009.
Cruide Oil Desalting Process, Intech 2015; http://dx/doi.org/10.5772/61274; Research Gate; Chapter 4, 19 pages.
International Search Report and Written Opinion issued in International Application No. PCT/US2018/037278 dated Sep. 5, 2018, 14 pages.

*Primary Examiner* — Renee Robinson
(74) *Attorney, Agent, or Firm* — Fish & Richardson P.C.

(57) ABSTRACT

The present disclosure describes a method including: receiving input data from a gas and oil separation plant (GOSP), wherein: one or more demulsifiers is being injected into an emulsion to achieve a separation, a plurality of flow rates of water and the one or more demulsifiers are being measured inside the GOSP, the input data comprises the plurality of flow rates as well as temperatures corresponding to the plurality of flow rates, and determining, for each of the one or more demulsifiers, efficiencies of the separation based on the flow rates measured at corresponding temperatures; grouping respective efficiencies of separation according to a set of temperature ranges; and generating, for at least one temperature range, a histogram for the at least one temperature range; ranking the one or more demulsifiers according to the histogram; and providing a feedback to indicate a ranked order of the one or more demulsifiers.

18 Claims, 11 Drawing Sheets

ENHANCED DEMULSIFIER PERFORMANCE RANKING PROCEDURE AND ALGORITHM BASED ON SEPARATION EFFICIENCY

TECHNICAL FIELD

This disclosure generally relates to crude oil processing.

BACKGROUND

Crude oil includes an emulsion of oil and water. Crude oil processing introduces one or more demulsifiers to facilitate the separation of oil and water.

SUMMARY

In one aspect, the present disclosure describes a computer-implemented method including: receiving input data from a plurality of sensors at a gas and oil separation plant (GOSP), wherein: one or more demulsifiers is being injected into an emulsion that includes an oil phase and an aqueous phase to achieve a separation thereof, the plurality of sensors measure a plurality of flow rates of water and the one or more demulsifiers inside the GOSP, the input data comprises the plurality of flow rates measured by the plurality of sensors as well as temperatures corresponding to the plurality of flow rates being measured, and determining, for each of the one or more demulsifiers, efficiencies of the separation based on the flow rates measured at corresponding temperatures; grouping, for each of the one or more demulsifiers, respective efficiencies of separation according to a set of temperature ranges; and generating, for each of the one or more demulsifiers and for at least one temperature range, a histogram that describes a number of counts within the at least one temperature range; ranking the one or more demulsifiers according to the histogram; and providing a feedback to an operator to indicate a ranked order of the one or more demulsifiers.

Implementations may include one or more of the following features.

The method may further include: grouping, at the at least one temperature range, the respective efficiencies of separation for the one or more demulsifiers into a set of efficiency ranges, wherein: the histogram is generated for each efficiency range of the set of efficiency ranges.

The method may further include: determining whether all of the one or more demulsifiers are present in the histogram for an efficiency range at one temperature range. The method may further include: in response to determining that not all of the one or more demulsifiers are present in the histogram for the efficiency range, ranking the one or more demulsifiers according to the respective efficiencies of separation.

The method may further include: in response to determining that all of the one or more demulsifiers are present in the histogram for the efficiency range, determining whether all of the one or more demulsifiers are present in the histogram for an efficiency range at more than one temperature ranges. The method may further include: in response to determining that all of the one or more demulsifiers are present in the histogram for the efficiency range, determining whether all of the one or more demulsifiers are present in the histogram for an efficiency range at more than one temperature ranges. The method may further include: in response to determining that all of the one or more demulsifiers are present in the histogram for an efficiency range at one temperature range, ranking the one or more demulsifiers according to respective concentrations of the one or more demulsifiers in the efficiency range and at the temperature range.

The method may further include: in response to determining that all of the one or more demulsifiers are present in the histogram for an efficiency range at more than one temperature ranges, prioritizing the more than one temperature ranges in descending order of the temperature range. The method may further include: ranking the one or more demulsifiers according to respective concentrations of the one or more demulsifiers in the efficiency range and at a prioritized temperature range.

The flow rates of water may include a flow rate at an outlet of a high pressure production trap (HPPT) vessel and a plant water flow rate.

In another aspect, the present disclosure describes a computer system including one or more processors configured to perform operations of: receiving input data from a plurality of sensors at a gas and oil separation plant (GOSP), wherein: one or more demulsifiers is being injected into an emulsion that includes an oil phase and an aqueous phase to achieve a separation thereof, the plurality of sensors measure a plurality of flow rates of water and the one or more demulsifiers inside the GOSP, the input data comprises the plurality of flow rates measured by the plurality of sensors as well as temperatures corresponding to the plurality of flow rates being measured, and determining, for each of the one or more demulsifiers, efficiencies of the separation based on the flow rates measured at corresponding temperatures; grouping, for each of the one or more demulsifiers, respective efficiencies of separation according to a set of temperature ranges; and generating, for each of the one or more demulsifiers and for at least one temperature range, a histogram that describes a number of counts within the at least one temperature range; ranking the one or more demulsifiers according to the histogram; and providing a feedback to an operator to indicate a ranked order of the one or more demulsifiers.

Implementations may include one or more of the following features.

The operations may further include: grouping, at the at least one temperature range, the respective efficiencies of separation for the one or more demulsifiers into a set of efficiency ranges, wherein: the histogram is generated for each efficiency range of the set of efficiency ranges.

The operations may further include: determining whether all of the one or more demulsifiers are present in the histogram for an efficiency range at one temperature range. The operations may further include: in response to determining that not all of the one or more demulsifiers are present in the histogram for the efficiency range, ranking the one or more demulsifiers according to the respective efficiencies of separation.

The operations may further include: in response to determining that all of the one or more demulsifiers are present in the histogram for the efficiency range, determining whether all of the one or more demulsifiers are present in the histogram for an efficiency range at more than one temperature ranges. The operations may further include: in response to determining that all of the one or more demulsifiers are present in the histogram for the efficiency range, determining whether all of the one or more demulsifiers are present in the histogram for an efficiency range at more than one temperature ranges.

The operations may further include: in response to determining that all of the one or more demulsifiers are present in the histogram for an efficiency range at one temperature range, ranking the one or more demulsifiers according to respective concentrations of the one or more demulsifiers in the efficiency range and at the temperature range. The operations may further include: in response to determining that all of the one or more demulsifiers are present in the histogram for an efficiency range at more than one temperature ranges, prioritizing the more than one temperature ranges in descending order of the temperature range. The operations may further include: ranking the one or more demulsifiers according to respective concentrations of the one or more demulsifiers in the efficiency range and at a prioritized temperature range.

The flow rates of water may include a flow rate at an outlet of a high pressure production trap (HPPT) vessel and a plant water flow rate.

Implementations according to the present disclosure may be realized in computer implemented methods, hardware computing systems, and tangible computer readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The details of one or more implementations of the subject matter of this specification are set forth in the description, the claims, and the accompanying drawings. Other features, aspects, and advantages of the subject matter will become apparent from the description, the claims, and the accompanying drawings.

DESCRIPTION OF DRAWINGS

Like reference numbers and designations in the various drawings indicate like elements.

DETAILED DESCRIPTION

Crude oil comes in a form of emulsion that includes an oil phase and an aqueous phase. Various treatment methods can be used to demulsify the crude oil. For example, the treatment methods can incorporate demulsifying-effective amount of a demulsifier into the emulsion to separate the oil phase from the aqueous phase. Finding the best performing and most cost effective demulsifier can be challenging due to unexpected variations common to the processing plants. Temperature fluctuations and production upsets can cause the data collected during field trials of test demulsifiers very challenging to compare and rank.

The present disclosure describes a method to read and select the field data without requiring approximations or models to rank the best performing demulsifiers. The disclosed technology is directed to ranking demulsifier chemicals that are tested in the field based on their performance in separating free water from wet crude. The raking process incorporates applying correlations between demulsifier concentrations and separation efficiency at various temperatures. Demulsifiers that result in the greatest separation efficiency at the lowest concentration are ranked the highest. The disclosed technology has been validated through laboratory testing of the field tested demulsifiers and crude oil emulsions using nuclear magnetic resonance (NMR).

Figure 1:
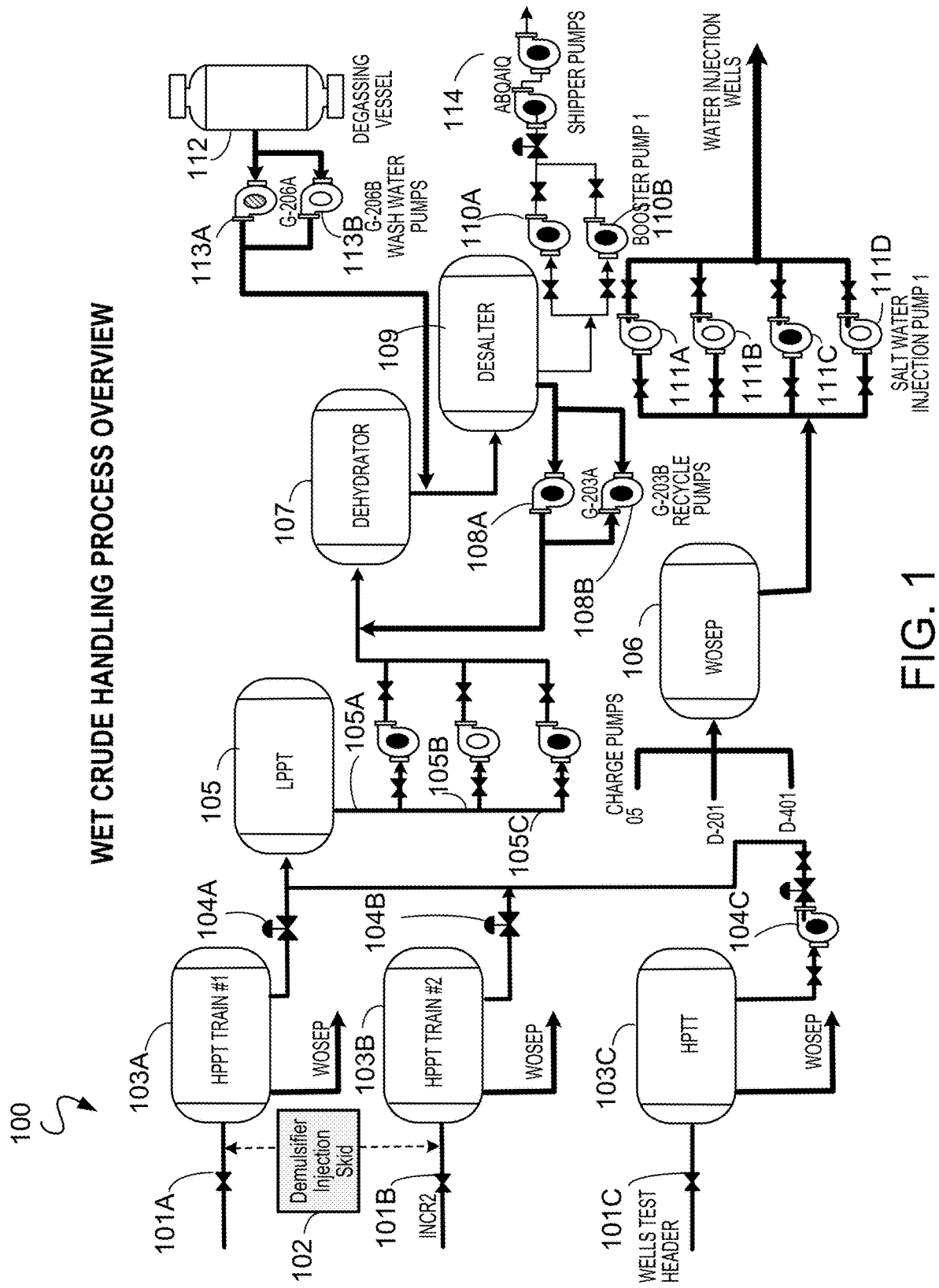
FIG. 1 illustrates an example of a schematic of Gas-Oil Separation Plant (GOSP) according to an implementation of the present disclosure.

Referring to FIG. 1 showing an example of a schematic 100 of a Gas-Oil Separation Plant (GOSP), demulsifier is often injected at the production header of a Gas-Oil Separation Plant to treat emulsions by breaking the interfacial film of water droplets, allowing for water droplet coalescence in the High Pressure Production Trap (HPPT). This is followed by droplet settling and separation from the crude oil. Droplets that have not settled from the crude oil layer are discharged to the desalting train via the Low Pressure Production Trap (LPPT) to coalesce and settle under an electrostatic field induced by the electrostatic coalescer grids.

In more detail, HPPT train 103A and HPPT train 103B receive input emulsions 101A and 101B through demulsifier injection skid 102. For context, an injection skid is piece of equipment designed to inject chemicals into a system at the required pressure for the system. HPTT 103C receives input emulsion 101C on well & test header. HPPT train 103A and HPPT train 103B respectively connect to valves 104A and 104B. High Pressure Test Trap (or HPTT) 103C connects to valve assembly 104C. The valve assembly 104C includes a pump. Through valves 104A and 104B, and valve assembly 104C, the outputs from HPPT trains 103A and 103B, and HPTT 103C are fed to LPPT 105. Through charge pumps 105A, 105B, and 105C, the output from LPPT 105 is provided to dehydration stage 107 where the remaining emulsions are separated. After the dehydration stage 107, the traces of emulsions with high salt content is diluted with wash water from degassing; vessel 112 through wash water pumps 113A and 113B. The output from dehydration stage 107 is provided to desalter device 109. The desalter device 109, through recycle pumps 108A and 108B, provides feedback flow to dehydration stage 107. Through booster pumps 110A and 110B, the desalter device provides inflow to shipper pumps 114, which can provide output. Additionally, HPPT pumps 103A and 103B, and HPPT 103C can connect to water-oil separator (WOSEP) 106 for water treatment, which in turn, is coupled to salt water injection pumps 111A, 111B, 111C, and 111D to provide input to water injection wells.

Operations have the capability of adjusting the demulsifier rate to control the concentration of the demulsifier in wet crude. The desired concentration of the demulsifier can depend on the kinetic and chemical properties of the demulsifier formulation. To compare the performance of various demulsifiers, a bottle test is conducted to short list the demulsifiers for consideration. A field trial is then conducted for final ranking of demulsifier performance.

The conditions may exist for demulsifier field trials. For example, the field trial may be conducted in winter to test demulsifier performance in the lowest operating temperature possible as it offers the most challenging conditions. Relatively insignificant changes to the well line-up may be done to maintain the same production rate, water-cut and emulsion tightness. The duration of the trial can be long enough (e.g., 10-14 days) to gather sufficient data for analysis. All controllers including HPPT interface level controllers and demulsifier flow controller may be in auto mode so that the demulsifier concentration can be controlled and that no bottleneck to separate the free water exists. Each trial must result in no upsets in the dehydrator, otherwise the demulsifier is disqualified.

Data for the analysis, which may be collected by a data historian, includes the crude temperature, oil and water flow rate, demulsifier rate, wash water rate, dehydrator or HPPT water rate and dehydrator grid voltage. Data is collected as an hourly average as a slow process where changes in demulsifier concentration may not have an instantaneous impact on separation. The first day of the trial is normally excluded as residual demulsifier from the previous day is present in the system.

Demulsifier performance may be intrinsically related to temperature. Higher temperatures can prompt the water separation from crude oil emulsions by decreasing the crude viscosity and allowing droplets to coalesce faster. In addition, the kinetics of the demulsifier action may be accelerated at higher temperatures. During field trials of test demulsifiers, it may not be feasible to maintain the processing temperatures constant. The field trials are done in a period of, for example, 10-14 days in which ambient temperatures can change according to weather and affect processing temperatures. It can be challenging to compare demulsifier performances at different temperatures because associating the temperature effect to the demulsifier action for different demulsifiers can be difficult. Each demulsifier has different compositions and mechanisms of action which are affected differently with the increase of temperature.

Figure 2:
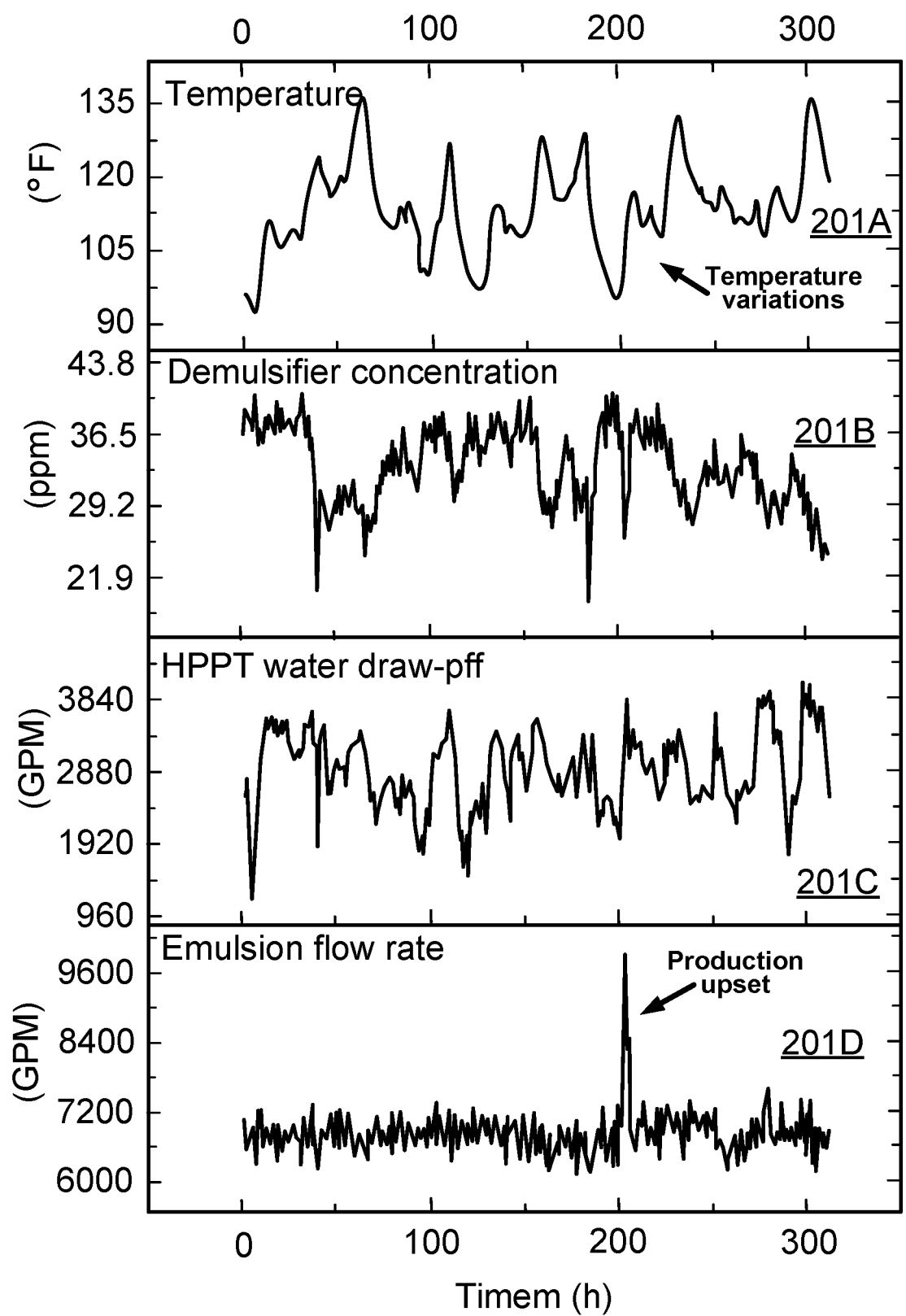
FIG. 2 illustrates an example of measurement data from a GOSP during the period of demulsifier testing according to an implementation of the present disclosure.

Referring to FIG. 2, the intricacy of demulsifier concentration is illustrated for an example of processing plant data during the period of demulsifier testing. Panel 201A illustrates the fluctuation of temperature during this period. Panel 201B illustrates the variation of demulsifier concentration during the same period. Panel 201C shows the evolving changes in HPPT water draw-off in gallons per minute (GPM). This unit is a flow unit of volume per time. This measurement may be taken at, for example, valves 104A and 104B of FIG. 1. Panel 201D shows the changes in emulsion flow rate in the same unit of GPM. As illustrated, the temperature variations have an effect on HPPT water draw off, as the higher temperatures contribute to more effective emulsion breakage and consequently more water draw off During normal operation, however, the GOSP control systems compensate for higher efficiency by decreasing demulsifier dosage automatically. Yet, these parameters are not directly correlated and are not periodical, making it very difficult to extract the temperature effect from the demulsifier and separation efficiency of the HPPT vessel (e.g., HPPT trains 103A and 103B). Therefore, it may not be feasible to correlate the demulsifier effect to separation efficiency. Indeed, as shown in FIG. 2D, occasional production upsets at the inlet of the GOSP also affect the HPPT water draw off, and consequently affect the compensation in demulsifier dosage.

Implementations may combine the whole dataset of demulsifier dosage and separation efficiency during the period when the candidate demulsifiers are being tested. The implementations may then categorize each occurrence into comparable bins. Statistically this method can be more robust due to the large amount of data available. Outliers can be eliminated during data processing to avoid unusual effects, such as buildup of demulsifier in the system when the demulsifier dosage is reduced from a higher to lower dose. Some implementations may include a software program that reads and classifies the field data, compares the performance and outputs the demulsifier dosage per separation efficiency was developed.

Figure 3A:
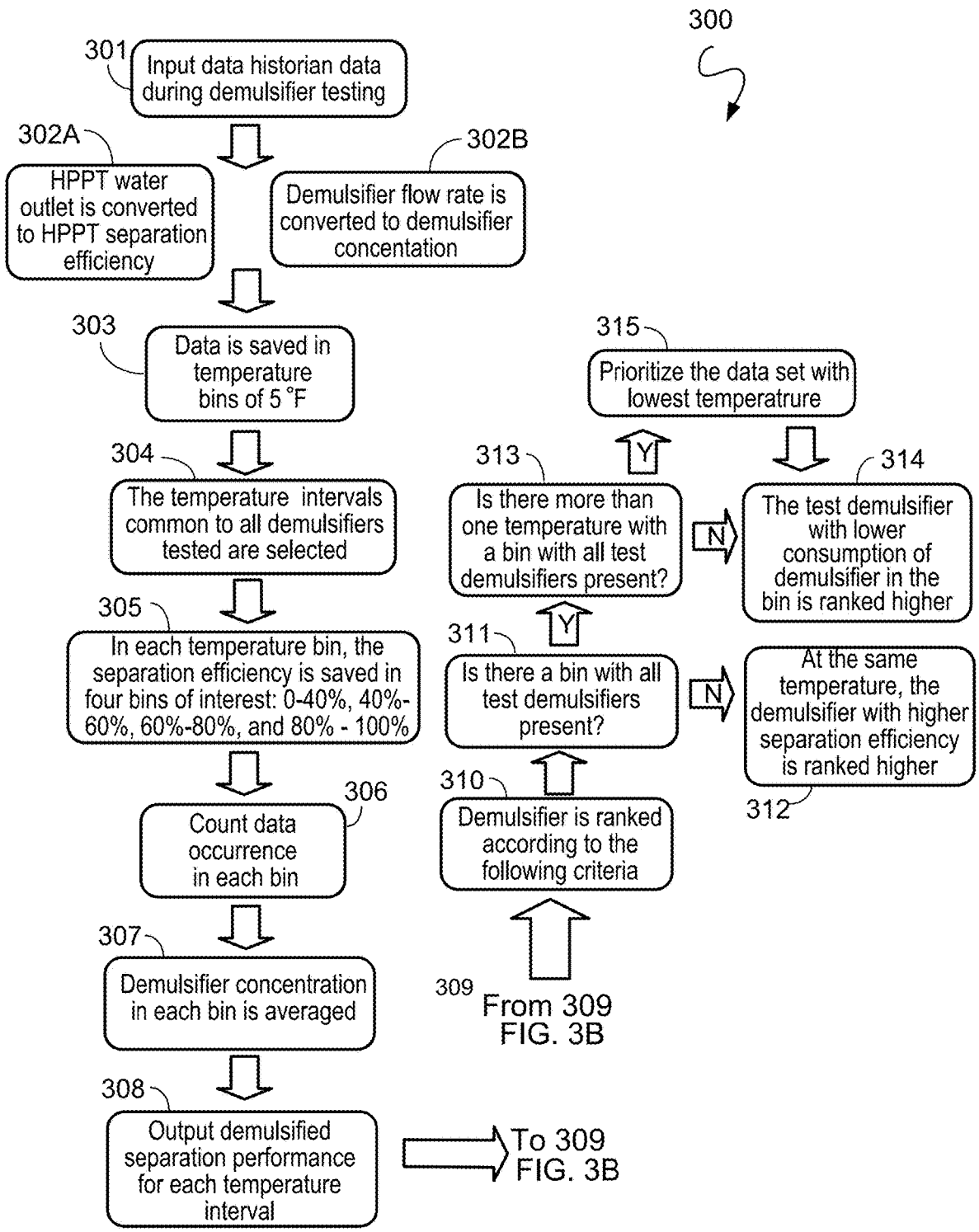
FIG. 3A-3B illustrate an example of a flow chart for reading demulsifier field trial test data, classifying the data and comparing the demulsifier performance according to an implementation of the present disclosure.
Figure 3B:
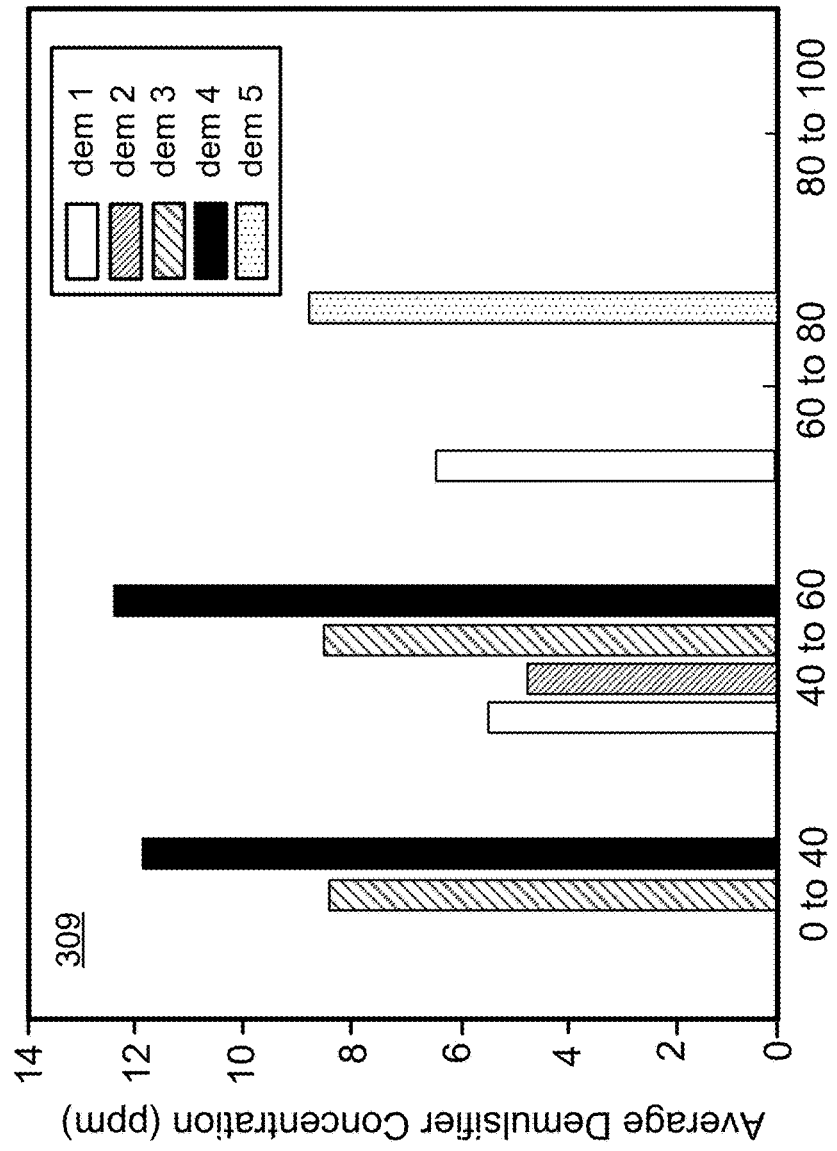

In more detail, FIG. 3 describes flow chart 300 for a method that is computer implemented. The method includes classifying the data into temperature bins of 5° F. The temperature range of each demulsifier tested may be determined by finding the minimum and maximum temperature within the dataset. The number of temperature bins for each test demulsifier may depend on the range of temperatures during the field trial. The 5° F. temperature bins are then compared across different demulsifiers and only the common bins are chosen to proceed towards the next step.

Referring to FIG. 3, the method may collect plant data from the data historian (301) based on measurements taken at, for example, the GOSP of FIG. 1. Here, data from the HPPT water outlet may be converted to HPPT separation efficiency (302A). In particular, the separation efficiency can be determined from the processing plant data is calculated in two steps. First, the plant inlet water rate (volumetric rate of water from the oil wells to the HPPT vessel) is determined by deducting the wash water rate that is injected in the desalting process from the rate of plant water leaving the water-oil separator (WOSEP) or plant outlet. Second, the water output of the HPPT vessel is divided by the plant water rate calculated in the first step. The efficiency of the HPPT vessel (in percentage) is then determined as: 100× (HPPT water outlet)/(Plant Water Rate). Values of rates are either hour or half-hour averages. Gallons Per Minutes (GPM), Barrels per Day (BPD) or any consistent volumetric rate unit can be used to calculate the efficiency. Meanwhile, demulsifier rate may be converted to demulsifier concentration (302B).

Data is then arranged in bins of 5° F. (303). The temperature intervals that are common to all demulsifier tested can be selected for additional comparison and benchmarking (304). In each temperature bin, the separation bins can be arranged in four regions of interest (with respect to separation efficiency), for example, 0-40%, 40%-60%, 60%-80%, and 80-100% (305). Further illustrations can be found in FIGS. 4A to 4B.

Figure 4A:
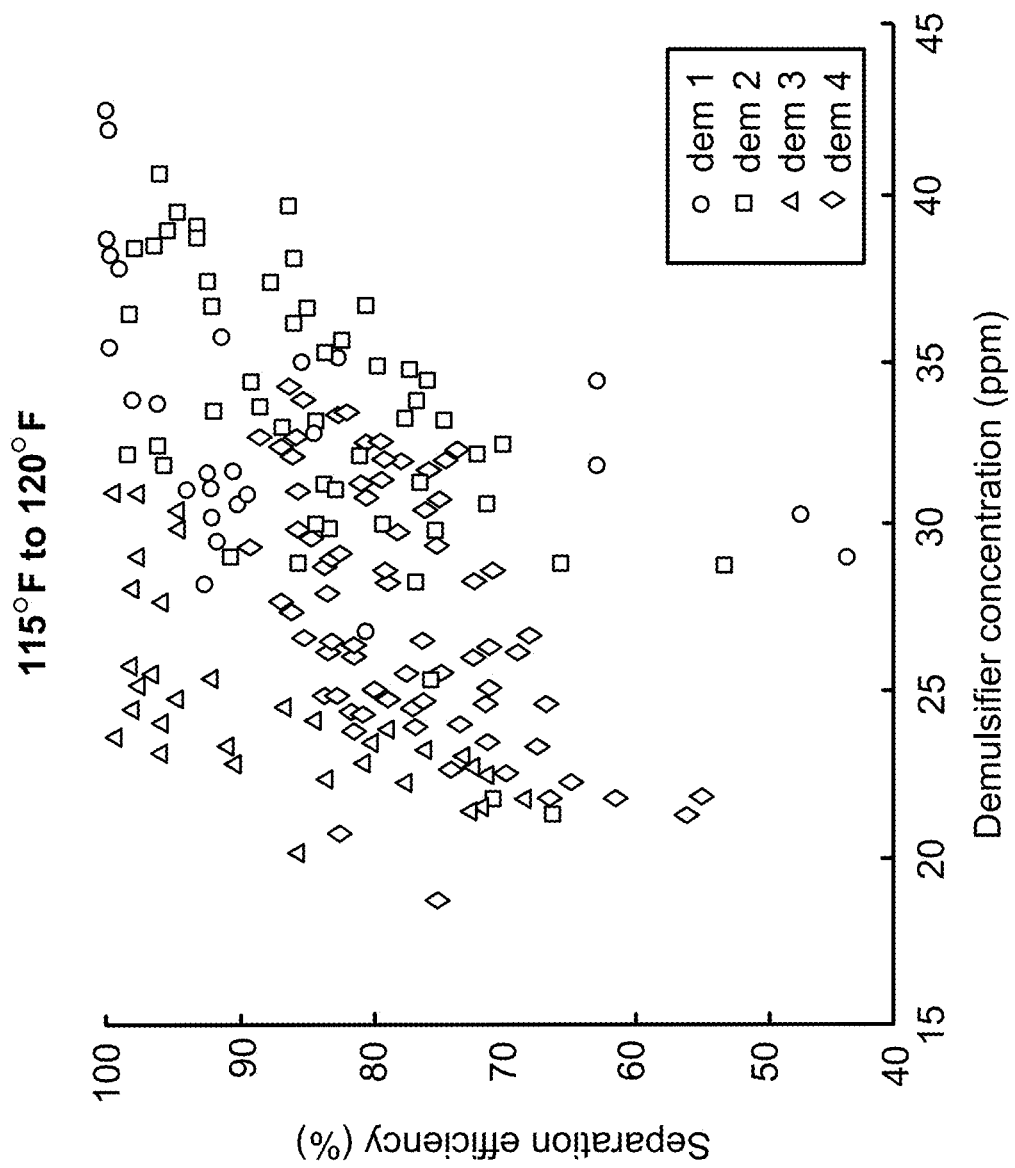
FIGS. 4A-4B illustrate examples of data processing according to an implementation of the present disclosure.
Figure 4B:
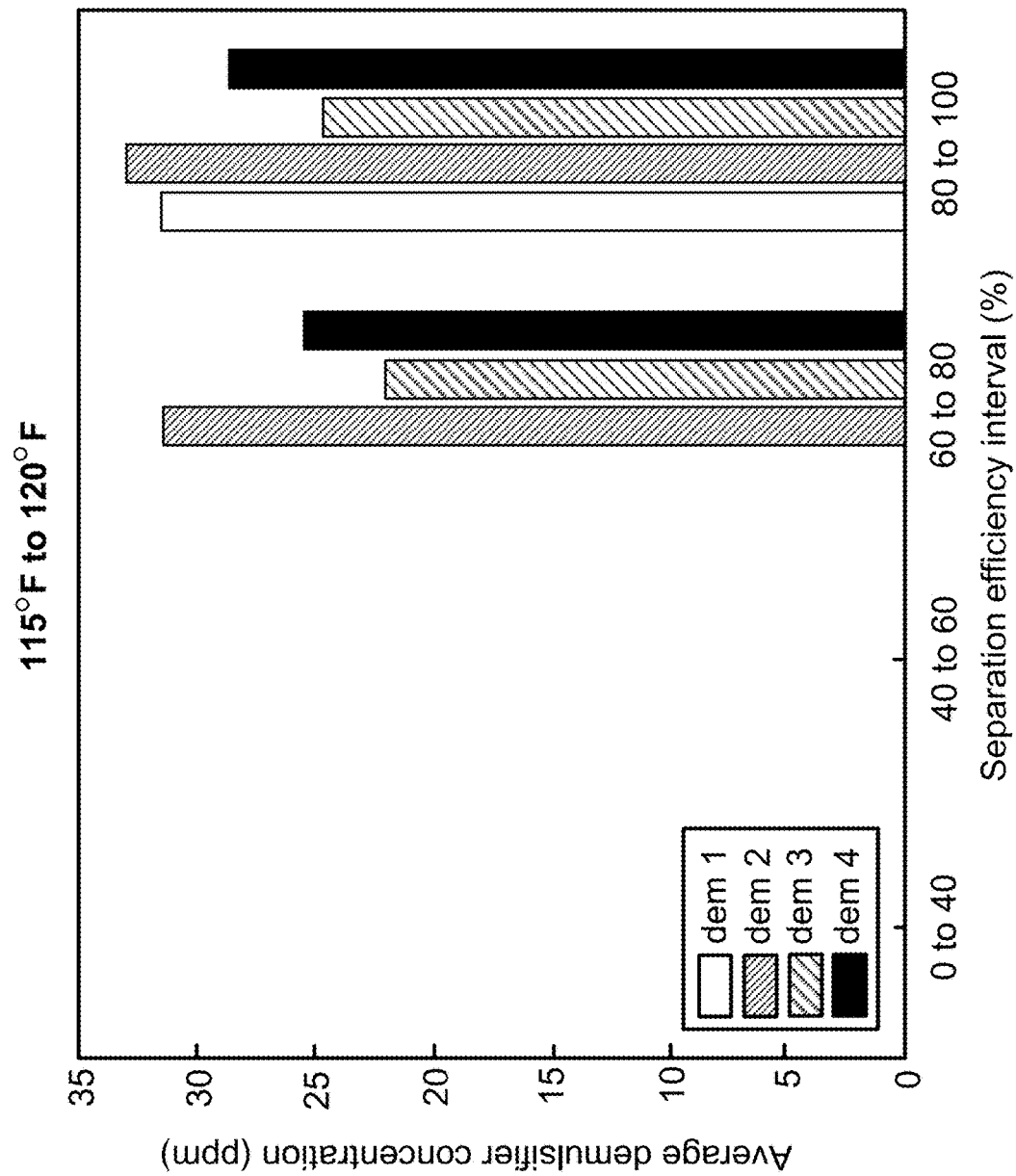

Further referring to FIGS. 4A to 4B, data within a temperature range common to all demulsifiers tested at the plant. In particular, FIG. 4A shows the separation of all tested demulsifiers within the temperature bin of 115° F. to 120° F. Once the data is saved in the temperatures bins common to all demulsifiers, the data is classified again into bins of separation performance. The data can be modified to be site specific based on overall emulsion tightness. The following performance bins were chosen based on production needs to facilitate the classification of the demulsifiers. From 0 to 40% HPPT separation efficiency, the separation performance is unsatisfactory. From 40 to 60% HPPT separation efficiency, the separation performance is low. From 60 to 80% HPPT separation efficiency, the separation performance is on target. From 80 to 100% HPPT separation efficiency, the separation performance is deemed high performance/overdose.

The data within each separation efficiency bin is count as an occurrence (306). The count of the occurrences may also be known as a histogram. The occurrences are compiled as the average of the demulsifier concentrations within the resulting separation efficiency bin (307). The demulsifier separation performance may then be output for each temperature interval (308). As an example, 309 shows the data occurrences for each separation efficiency bin for all four demulsifiers being tested at a temperature interval from 140° F. to 145° F. 309 is similar to FIG. 4B, which shows demulsifier separation performance in four bins from a temperature interval from 115° F. to 120° F.

The demulsifiers are then ranked (310). Here, the separation efficiency plots are examined for all common temperature ranges. First, a determination (311) is made as to whether there is a separation efficiency bin showing all demulsifiers being tested simultaneously (such as bin "80 to 100" in FIG. 4B), then all demulsifiers are used for ranking. If the determination is low, then, at the same temperature, the demulsifier with the higher separation efficiency is ranked higher (312). If the determination is yes, then another determination is made as to whether there is more than one temperature bin with all test demulsifiers present (313). If the determination is no, then the test demulsifier with lower consumption of the test demulsifier in the efficiency bin is ranked higher (314). The test demulsifiers are then ranked according to their average demulsifier concentration: the lower the demulsifier usage for the given efficiency, the best is the demulsifier. In the example of FIG. 4B, the ranking of the test demulsifiers is: 1st: dem 3; 2nd: dem 4; 3rd: dem 1; 4th: dem 2. If the determination is yes, then data set with a lower temperature interval is prioritized (315). For example, the data set from the temperature bin of 115° F. to 120° F. (FIG. 4B) takes precedence over the temperature bin of 140° F. to 145° F. (309).

Figure 5:
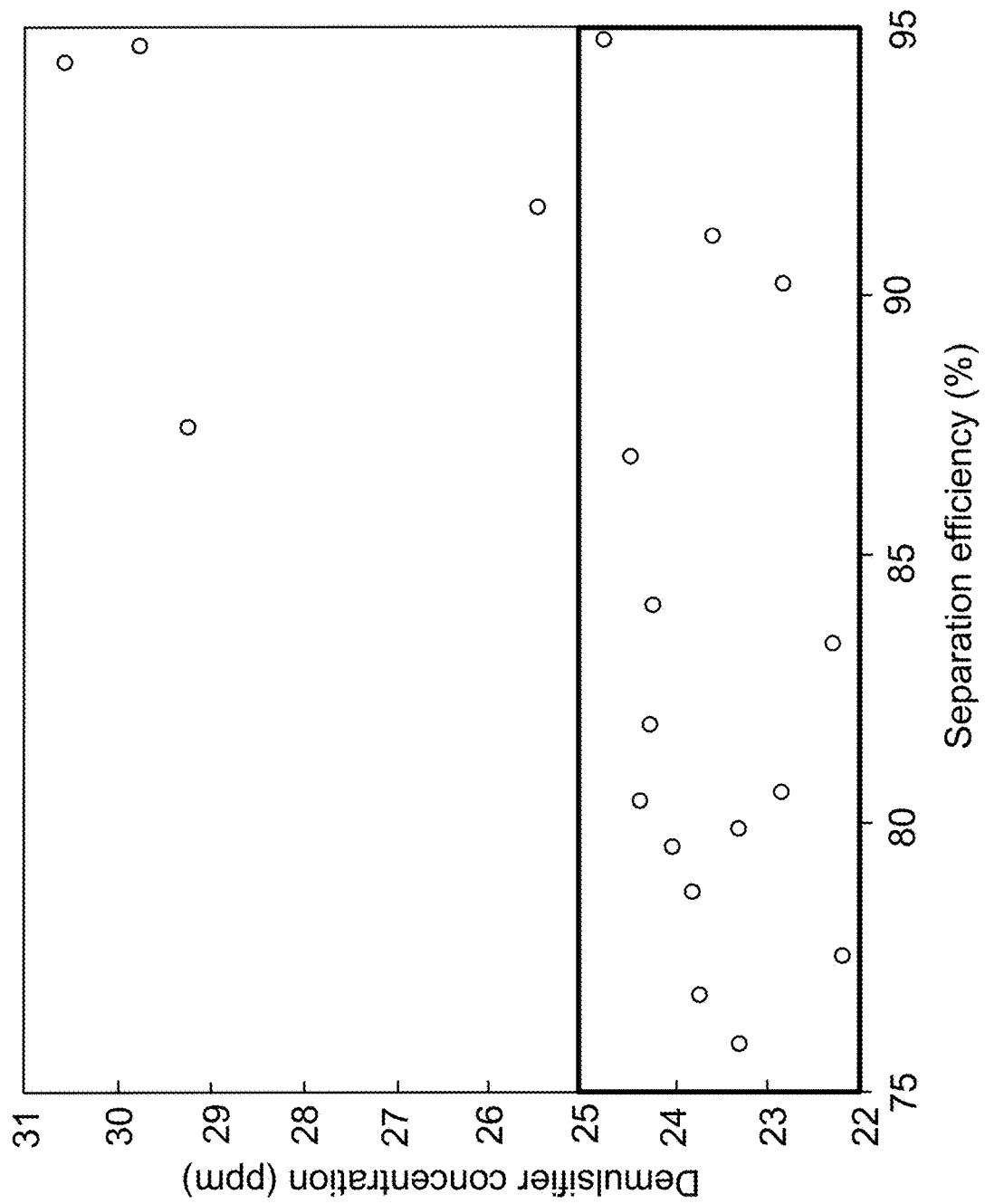
FIG. 5 illustrates an example of values of demulsifier concentration per separation efficiency for a chosen demulsifier according to an implementation of the present disclosure.

In addition to the ranking, the disclosed methodology also provides insightful guidelines to the operators on what is the expected demulsifier dosage to achieve separation within the desired separation efficiency. For example, by reviewing data for the demulsifier ranked most efficient in FIG. 4B ("dem 3"), it becomes feasible to determine, as seen in FIG. 5, that demulsifier concentrations between 22-25 ppm will yield HPPT separation efficiency above 75%.

Figure 6:
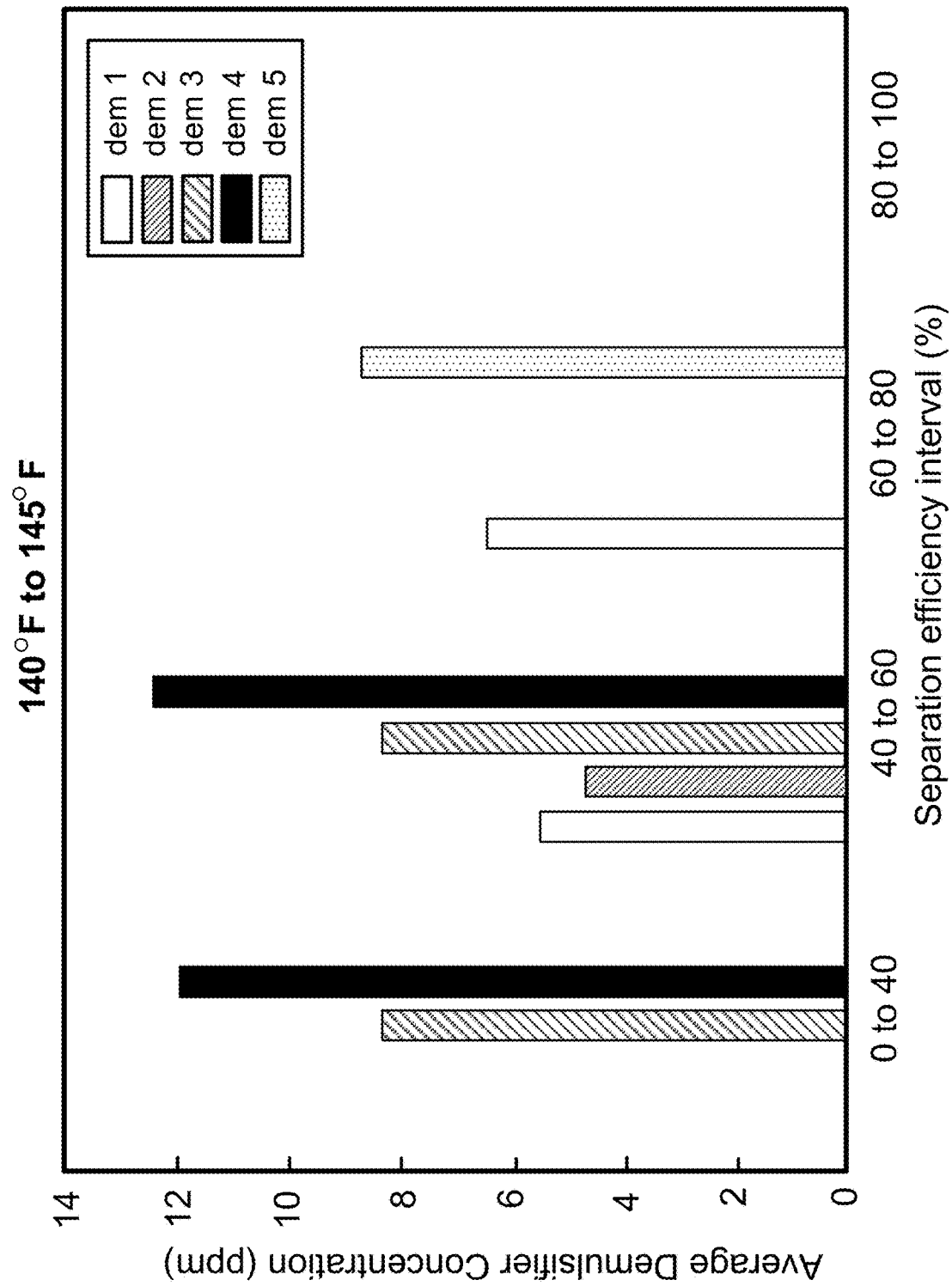
FIG. 6 illustrates an example of GOSP data according to an implementation of the present disclosure.
Figure 7:
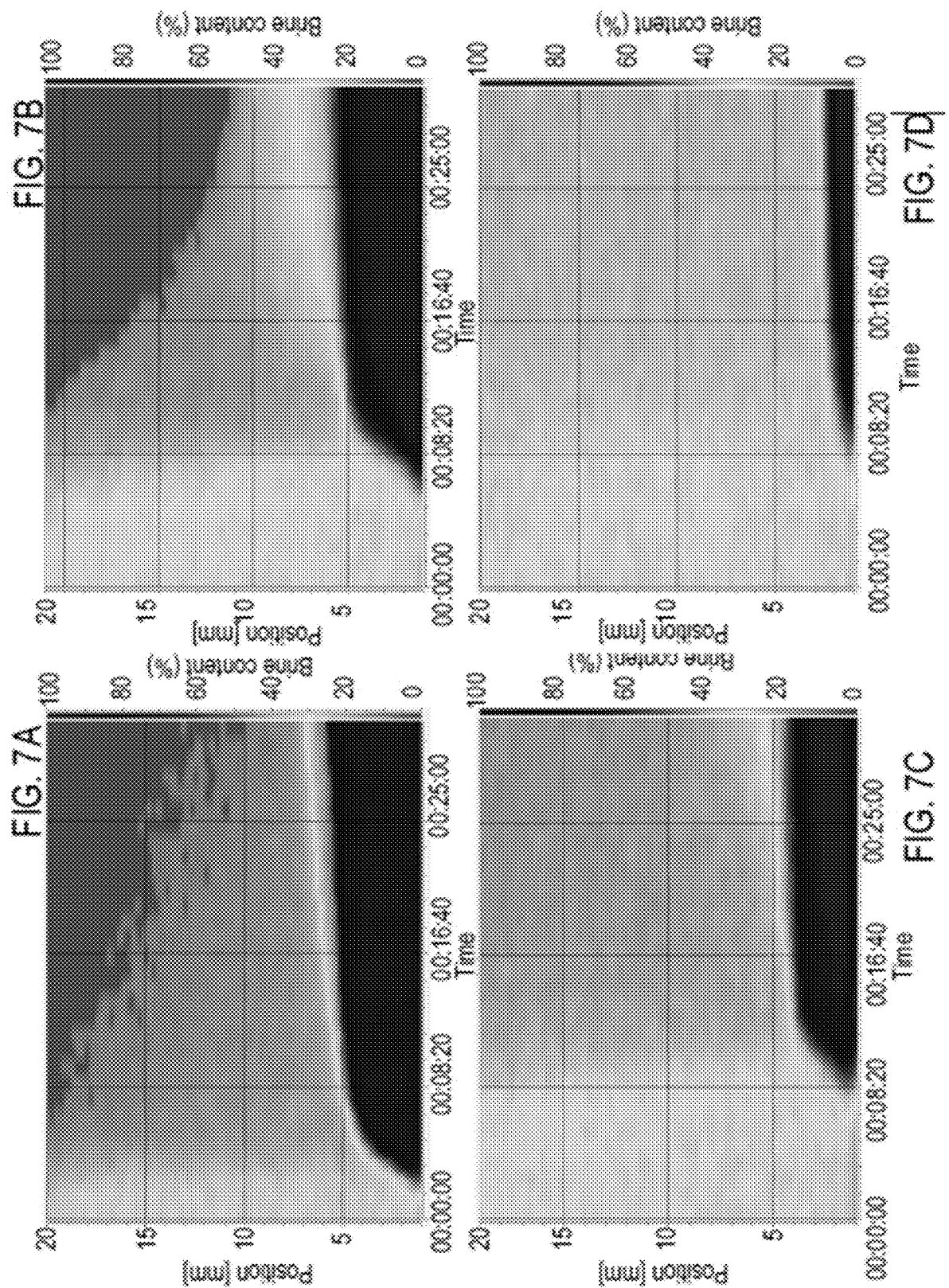
FIG. 7A to 7D illustrate examples of water profiling measured by NMR after field tests according to an implementation of the present disclosure.
Figure 8:
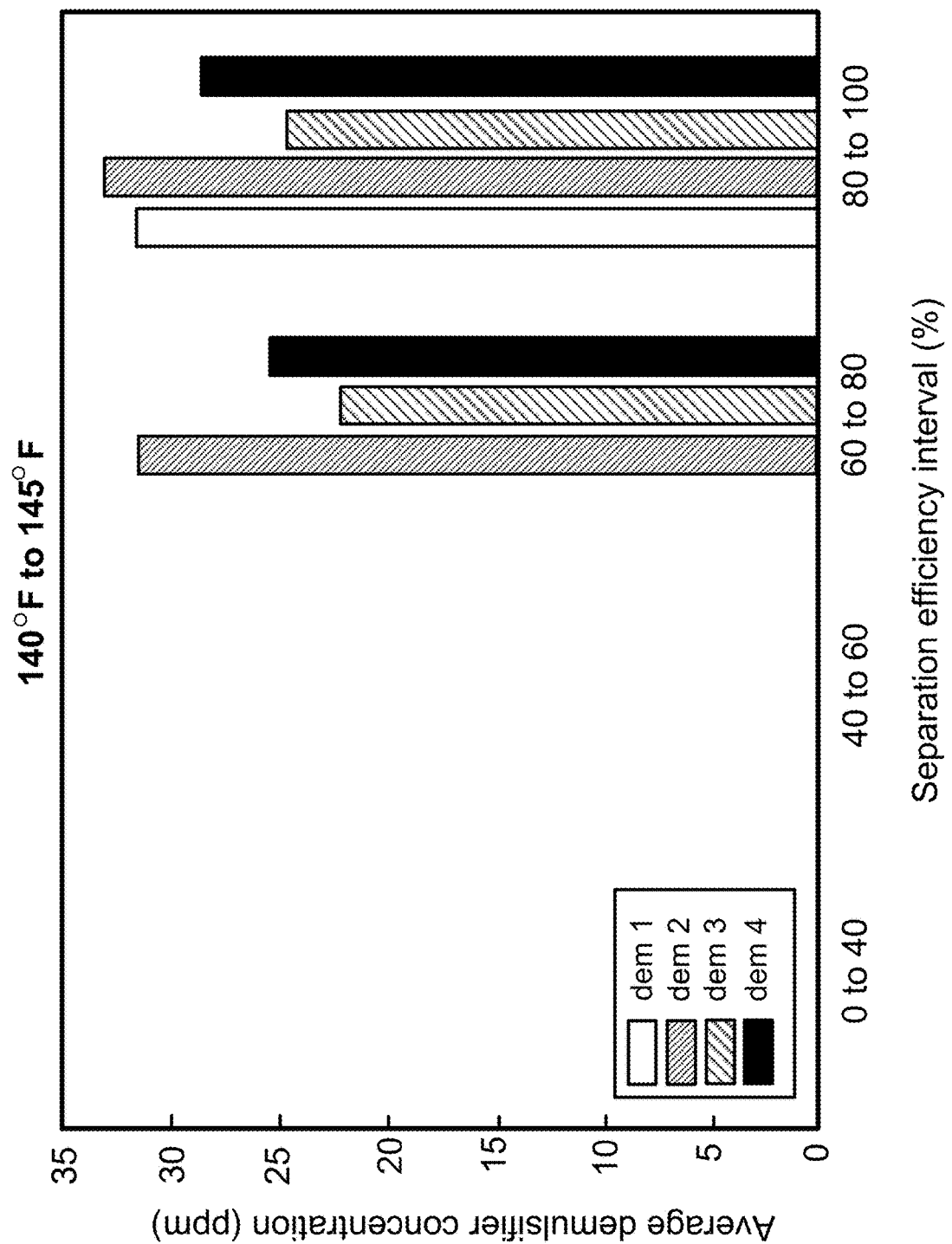
FIG. 8 illustrates a ranking according to an implementation of the present disclosure.

In some circumstances, the data from the GOSP plant might not be sufficient to compare the test demulsifiers, likely due to discrepancies within the GOSP parameters of each field trial. For example, in some cases, the data does not show common temperature ranges. When the test demulsifiers were not applied with a common temperature intervals, the field trials were carried out at different processing temperatures. This is generally not a likely scenario as the demulsifier field trials are scheduled in the same period of the year and the temperatures are not expected to change significantly. If this unlikely scenario is detected, it may be preferable to repeat the field trials. In another example, not all demulsifiers are present within a same separation efficiency bin, as exemplified in FIG. 6, which corresponds to 309 from FIG. 3. If this occurs, the demulsifiers may still be ranked. The demulsifier with the highest separation efficiency within the same temperature interval is deemed the most efficient. Then the other demulsifiers located within a same bin are ranked as described in FIG. 3.

The proof-of-concepts results can be verified by laboratory experiments using pulsed-field-gradient nuclear magnetic resonance (NMR), which is a state-of-the art technique recently developed to assess emulsion separation. This technique is used to determine which demulsifiers are more efficient based on 1-D images of the water drop-off. One GOSP was chosen and the same field test demulsifiers were tested in the lab, reaching the same ranking result. In short, the NMR is performed on emulsions recombined in lab from oil and water collected from the production plants. The NMR is a comparative test in which initial conditions are the same, not an absolute measurement which are not meant to be quantitatively compared to the process data.

In more detail, using a pulsed-field-gradient nuclear magnetic resonance (PFG-NMR), all emulsions were prepared with 30% water cut and the emulsification parameters were optimized to provide a uniform emulsion stable for 30 min without the use of demulsifier under 40° C. The oil samples were tested with the four top performing demulsifiers. The demulsifiers were dispensed by weight to a total emulsion volume of 12 mL after mixing, homogenized with slight hand shaking, and then quickly transferred to the sample tubes and placed into the NMR. The NMR was used to visualize the water drop off of from the emulsion by measuring the percentage of water through the height of the sample. Measurements were taken every 70 seconds, allowing the visualization of the time-evolution of the emulsion separation.

Water profiles of the separation for each demulsifiers can be seen as contour plots of water concentration in FIGS. 7A to 7D. The horizontal axis is the time after the experiment was started. Thus evolution as a function of time is recorded. The vertical axis is the water content as a function of position in the sample. Here, 0 is at the bottom and 20 mm is the height of the sample. The shades in FIGS. 7A to 7D indicate the water content. As illustrated, no water is on top (deep gray) and bulk water is at the bottom (dark) of FIGS. 7A-7D. Notably, the generated water profiles show initially uniform emulsion of 30% water which then start to separate with time, generating a layer of water on the bottom and dry oil on the top of the sample/figure. The shape of the water layer formed at the bottom of the figure, as well as the time this layer takes to form are indications of how one demulsifier is more effective than the other. The more efficient demulsifiers separate more water faster than the others.

From the water profiles FIGS. 7A to 7D, it becomes feasible to rank the demulsifiers performances according to the lab tests as: $1^{st}$: dem A, $2^{nd}$: dem B, $3^{rd}$: dem C, $4^{th}$: dem D. This result is in agreement with the results found from the software analysis in this invention for the same GOSP, as shown in FIG. 9.

Figure 9:
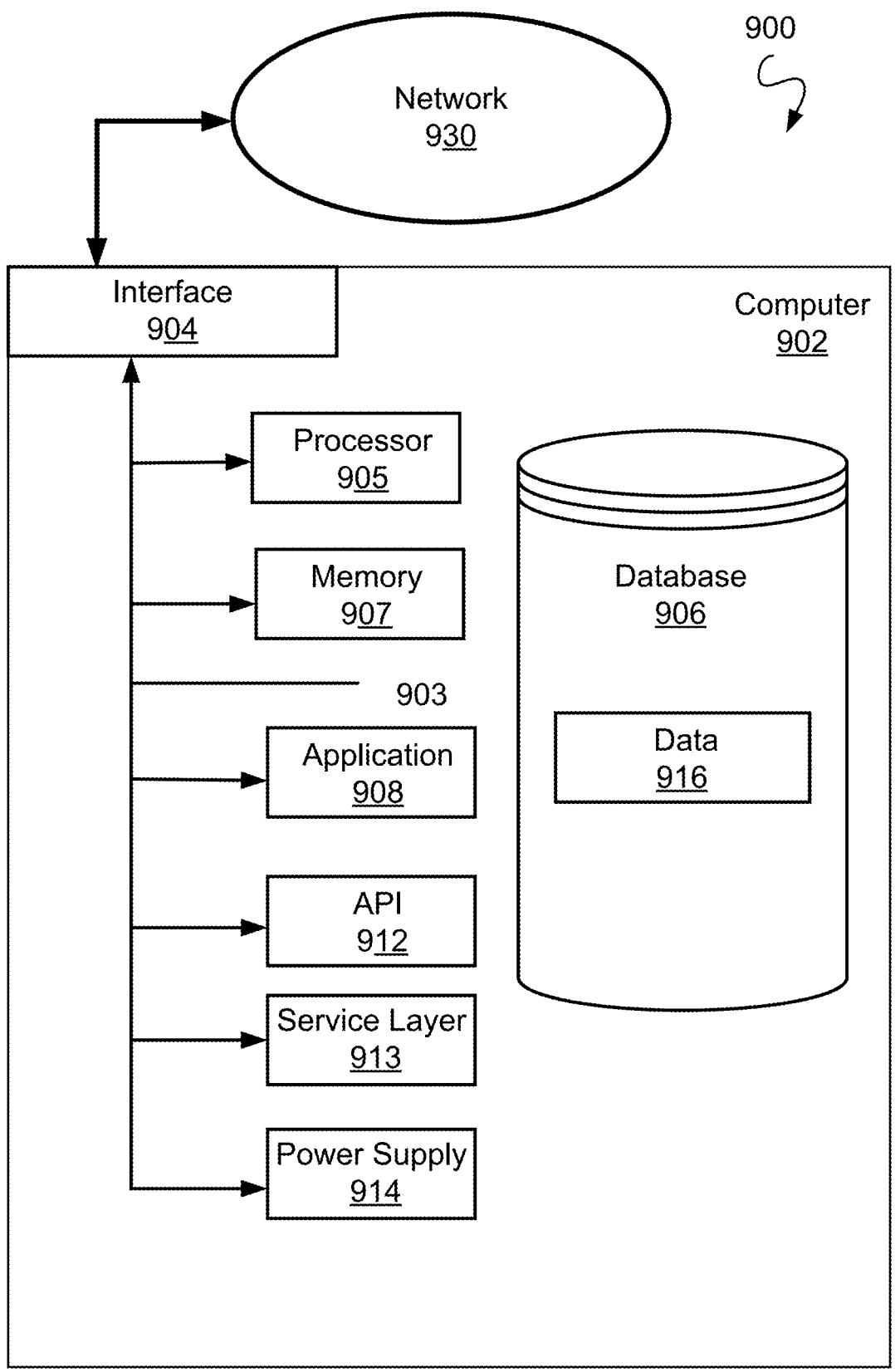
FIG. 9 is a block diagram illustrating an example of a computer system used to provide computational functionalities associated with described algorithms, methods, functions, processes, flows, and procedures, according to an implementation of the present disclosure.

FIG. 9 is a block diagram illustrating an example of a computer system 900 used to provide computational functionalities associated with described algorithms, methods, functions, processes, flows, and procedures, according to an implementation of the present disclosure. The illustrated computer 902 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 902 can comprise a computer that includes an input device, such as a keypad, keyboard, touch screen, another input device, or a combination of input devices that can accept user information, and an output device that conveys information associated with the operation of the computer 902, including digital data, visual, audio, another type of information, or a combination of types of information, on a graphical-type user interface (UI) (or GUI) or other UI.

The computer 902 can serve in a role in a computer system as a client, network component, a server, a database or another persistency, another role, or a combination of roles for performing the subject matter described in the present disclosure. The illustrated computer 902 is communicably coupled with a network 930. In some implementations, one or more components of the computer 902 can be configured to operate within an environment, including cloud-computing-based, local, global, another environment, or a combination of environments.

The computer 902 is an electronic computing device operable to receive, transmit, process, store, or manage data and information associated with the described subject matter. According to some implementations, the computer 902 can also include or be communicably coupled with a server, including an application server, e-mail server, web server, caching server, streaming data server, another server, or a combination of servers.

The computer 902 can receive requests over network 930 (for example, from a client software application executing on another computer 902) and respond to the received requests by processing the received requests using a software application or a combination of software applications. In addition, requests can also be sent to the computer 902 from internal users, external or third-parties, or other entities, individuals, systems, or computers.

Each of the components of the computer 902 can communicate using a system bus 903. In some implementations, any or all of the components of the computer 902, including hardware, software, or a combination of hardware and software, can interface over the system bus 903 using an application programming interface (API) 912, a service layer 913, or a combination of the API 912 and service layer 913. The API 912 can include specifications for routines, data structures, and object classes. The API 912 can be either computer-language independent or dependent and refer to a complete interface, a single function, or even a set of APIs. The service layer 913 provides software services to the computer 902 or other components (whether illustrated or not) that are communicably coupled to the computer 902. The functionality of the computer 902 can be accessible for all service consumers using this service layer. Software services, such as those provided by the service layer 913, provide reusable, defined functionalities through a defined interface. For example, the interface can be software written in MATLAB, JAVA, C++, another computing language, or a combination of computing languages providing data in extensible markup language (XML) format, another format, or a combination of formats. While illustrated as an integrated component of the computer 902, alternative implementations can illustrate the API 912 or the service layer 913 as stand-alone components in relation to other components of the computer 902 or other components (whether illustrated or not) that are communicably coupled to the computer 902. Moreover, any or all parts of the API 912 or the service layer 913 can be implemented as a child or a sub-module of another software module, enterprise application, or hardware module without departing from the scope of the present disclosure.

The computer 902 includes an interface 904. Although illustrated as a single interface 904 in FIG. 9, two or more interfaces 904 can be used according to particular needs, desires, or particular implementations of the computer 902. The interface 904 is used by the computer 902 for communicating with another computing system (whether illustrated or not) that is communicatively linked to the network 930 in a distributed environment. Generally, the interface 904 is operable to communicate with the network 930 and comprises logic encoded in software, hardware, or a combination of software and hardware. More specifically, the interface 904 can comprise software supporting one or more communication protocols associated with communications such that the network 930 or interface's hardware is operable to communicate physical signals within and outside of the illustrated computer 902.

The computer 902 includes a processor 905. Although illustrated as a single processor 905 in FIG. 9, two or more processors can be used according to particular needs, desires, or particular implementations of the computer 902. Generally, the processor 905 executes instructions and manipulates data to perform the operations of the computer 902 and any algorithms, methods, functions, processes, flows, and procedures as described in the present disclosure.

The computer 902 also includes a database 906 that can hold data for the computer 902, another component communicatively linked to the network 930 (whether illustrated or not), or a combination of the computer 902 and another component. For example, database 906 can be an in-memory, conventional, or another type of database storing data consistent with the present disclosure. In some implementations, database 906 can be a combination of two or more different database types (for example, a hybrid in-memory and conventional database) according to particular needs, desires, or particular implementations of the computer 902 and the described functionality. Although illustrated as a single database 906 in FIG. 9, two or more databases of similar or differing types can be used according to particular needs, desires, or particular implementations of the computer 902 and the described functionality. While database 906 is illustrated as an integral component of the computer 902, in alternative implementations, database 906 can be external to the computer 902. As illustrated, the database 906 holds the previously described data 916 including, for example, measurements taken at the GOSP plant shown in FIG. 1.

The computer 902 also includes a memory 907 that can hold data for the computer 902, another component or components communicatively linked to the network 930 (whether illustrated or not), or a combination of the computer 902 and another component. Memory 907 can store any data consistent with the present disclosure. In some implementations, memory 907 can be a combination of two or more different types of memory (for example, a combination of semiconductor and magnetic storage) according to particular needs, desires, or particular implementations of the computer 902 and the described functionality. Although illustrated as a single memory 907 in FIG. 9, two or more memories 907 or similar or differing types can be used according to particular needs, desires, or particular implementations of the computer 902 and the described functionality. While memory 907 is illustrated as an integral component of the computer 902, in alternative implementations, memory 907 can be external to the computer 902.

The application 908 is an algorithmic software engine providing functionality according to particular needs, desires, or particular implementations of the computer 902, particularly with respect to functionality described in the present disclosure. For example, application 908 can serve as one or more components, modules, or applications. Further, although illustrated as a single application 908, the application 908 can be implemented as multiple applications 908 on the computer 902. In addition, although illustrated as integral to the computer 902, in alternative implementations, the application 908 can be external to the computer 902.

The computer 902 can also include a power supply 914. The power supply 914 can include a rechargeable or non-rechargeable battery that can be configured to be either user- or non-user-replaceable. In some implementations, the power supply 914 can include power-conversion or management circuits (including recharging, standby, or another power management functionality). In some implementations, the power-supply 914 can include a power plug to allow the computer 902 to be plugged into a wall socket or another power source to, for example, power the computer 902 or recharge a rechargeable battery.

There can be any number of computers 902 associated with, or external to, a computer system containing computer 902, each computer 902 communicating over network 930. Further, the term "client," "user," or other appropriate terminology can be used interchangeably, as appropriate, without departing from the scope of the present disclosure. Moreover, the present disclosure contemplates that many users can use one computer 902, or that one user can use multiple computers 902.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/− R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method comprising:
receiving input data from a plurality of sensors at a gas and oil separation plant (GOSP), wherein:
two or more demulsifiers are being injected into an emulsion that includes an oil phase and an aqueous phase to achieve a separation thereof,
the plurality of sensors measure a plurality of flow rates of water and the two or more demulsifiers inside the GOSP,
the input data comprises the plurality of flow rates measured by the plurality of sensors as well as temperatures corresponding to the plurality of flow rates being measured, and
determining, for each of the two or more demulsifiers, efficiencies of the separation based on the flow rates measured at corresponding temperatures;
grouping, for each of the two or more demulsifiers, respective efficiencies of separation according to a set of temperature ranges; and
generating, for each of the two or more demulsifiers and for at least one temperature range, a histogram that describes a number of counts within the at least one temperature range;
ranking the two or more demulsifiers according to the histogram; and
providing a feedback to an operator to indicate a ranked order of the two or more demulsifiers.

2. The computer-implemented method of claim 1, further comprising:
grouping, at the at least one temperature range, the respective efficiencies of separation for the two or more demulsifiers into a set of efficiency ranges, wherein:
the histogram is generated for each efficiency range of the set of efficiency ranges.

3. The computer-implemented method of claim 2, further comprising:
determining whether all of the two or more demulsifiers are present in the histogram for an efficiency range at one temperature range.

4. The computer-implemented method of claim 3, further comprising:
in response to determining that not all of the two or more demulsifiers are present in the histogram for the efficiency range, ranking the two or more demulsifiers according to the respective efficiencies of separation.

5. The computer-implemented method of claim 3, further comprising:
in response to determining that all of the two or more demulsifiers are present in the histogram for the efficiency range, determining whether all of the two or more demulsifiers are present in the histogram for an efficiency range at more than one temperature ranges.

6. The computer-implemented method of claim 5, further comprising:
in response to determining that all of the two or more demulsifiers are present in the histogram for an efficiency range at one temperature range, ranking the two or more demulsifiers according to respective concentrations of the two or more demulsifiers in the efficiency range and at the temperature range.

7. The computer-implemented method of claim 5, further comprising:
in response to determining that all of the two or more demulsifiers are present in the histogram for an efficiency range at more than one temperature ranges, prioritizing the more than one temperature ranges in descending order of the temperature range.

8. The computer-implemented method of claim 7, further comprising:
ranking the two or more demulsifiers according to respective concentrations of the two or more demulsifiers in the efficiency range and at a prioritized temperature range.

9. The computer-implemented method of claim 1, wherein the flow rates of water comprise a flow rate at an outlet of a high pressure production trap (HPPT) vessel and a plant water flow rate.

10. A computer system comprising one or more processors configured to perform operations of:
receiving input data from a plurality of sensors at a gas and oil separation plant (GOSP), wherein:
two or more demulsifiers are being injected into an emulsion that includes an oil phase and an aqueous phase to achieve a separation thereof,
the plurality of sensors measure a plurality of flow rates of water and the two or more demulsifiers inside the GOSP,
the input data comprises the plurality of flow rates measured by the plurality of sensors as well as temperatures corresponding to the plurality of flow rates being measured, and
determining, for each of the two or more demulsifiers, efficiencies of the separation based on the flow rates measured at corresponding temperatures;
grouping, for each of the two or more demulsifiers, respective efficiencies of separation according to a set of temperature ranges; and
generating, for each of the two or more demulsifiers and for at least one temperature range, a histogram that describes a number of counts within the at least one temperature range;
ranking the two or more demulsifiers according to the histogram; and providing a feedback to an operator to indicate a ranked order of the two or more demulsifiers.

11. The computer system of claim 10, wherein the operations further comprise:
grouping, at the at least one temperature range, the respective efficiencies of separation for the two or more demulsifiers into a set of efficiency ranges, wherein:
the histogram is generated for each efficiency range of the set of efficiency ranges.

12. The computer system of claim 11, wherein the operations further comprise:
determining whether all of the two or more demulsifiers are present in the histogram for an efficiency range at one temperature range.

13. The computer system of claim 12, wherein the operations further comprise:
in response to determining that not all of the two or more demulsifiers are present in the histogram for the efficiency range, ranking the two or more demulsifiers according to the respective efficiencies of separation.

14. The computer system of claim 12, wherein the operations further comprise:
in response to determining that all of the two or more demulsifiers are present in the histogram for the efficiency range, determining whether all of the two or more demulsifiers are present in the histogram for an efficiency range at more than one temperature ranges.

15. The computer system of claim 14, wherein the operations further comprise:
in response to determining that all of the two or more demulsifiers are present in the histogram for an efficiency range at one temperature range, ranking the two or more demulsifiers according to respective concentrations of the two or more demulsifiers in the efficiency range and at the temperature range.

16. The computer system of claim 14, wherein the operations further comprise:
in response to determining that all of the two or more demulsifiers are present in the histogram for an efficiency range at more than one temperature ranges, prioritizing the more than one temperature ranges in descending order of the temperature range.

17. The computer system of claim 16, wherein the operations further comprise:
ranking the two or more demulsifiers according to respective concentrations of the two or more demulsifiers in the efficiency range and at a prioritized temperature range.

18. The computer system of claim 10, wherein the flow rates of water comprise a flow rate at an outlet of a high pressure production trap (HPPT) vessel and a plant water flow rate.

* * * * *